United States Patent
Glade et al.

(10) Patent No.: US 12,433,276 B2
(45) Date of Patent: Oct. 7, 2025

(54) FISHING DEVICE WITH HOOK KEEPING FEATURES

(71) Applicants: Mark Glade, Newton, KS (US); Cassie Glade, Newton, KS (US); Stephen Owens, Hesston, KS (US)

(72) Inventors: Mark Glade, Newton, KS (US); Cassie Glade, Newton, KS (US); Stephen Owens, Hesston, KS (US)

(73) Assignee: Finman Holdings, LLC, Hesston, KS (US)

( * ) Notice: Subject to any disclaimer, the term of this patent is extended or adjusted under 35 U.S.C. 154(b) by 0 days.

(21) Appl. No.: 18/737,270

(22) Filed: Jun. 7, 2024

(65) Prior Publication Data

US 2025/0176515 A1 Jun. 5, 2025

Related U.S. Application Data

(60) Provisional application No. 63/507,081, filed on Jun. 8, 2023.

(51) Int. Cl.
*A01K 87/00* (2006.01)

(52) U.S. Cl.
CPC .......... *A01K 87/008* (2022.02); *A01K 87/009* (2022.02)

(58) Field of Classification Search
CPC .... A01K 97/008; A01K 97/009; A01K 97/06; A01K 87/00; A01K 87/04; A01K 97/00; A01K 87/06; A01K 87/02; A01K 87/007; A01K 89/01925; A01K 91/04
See application file for complete search history.

(56) References Cited

U.S. PATENT DOCUMENTS

| | | | | |
|---|---|---|---|---|
| 2,514,645 A * | 7/1950 | Miller | A01K 97/06 43/25.2 |
| 2,829,461 A * | 4/1958 | Tuttle | A01K 97/06 43/25.2 |
| 3,281,981 A * | 11/1966 | Dykhouse | A01K 97/06 24/21 |
| 3,411,232 A * | 11/1968 | Rumbaugh | A01K 87/00 43/25.2 |
| 3,763,589 A * | 10/1973 | Werner | G01G 19/60 43/25.2 |
| 4,726,140 A * | 2/1988 | Mears | A01K 97/00 43/25 |
| 4,823,498 A * | 4/1989 | Banta | A01K 97/00 43/25 |
| 8,813,416 B2 * | 8/2014 | Hudson | A01K 97/06 43/25.2 |
| 11,266,138 B1 * | 3/2022 | Oltorik, III | A01K 87/04 |
| 2010/0299941 A1 * | 12/2010 | Marlin | A01K 97/00 30/296.1 |
| 2018/0070572 A1 * | 3/2018 | Lewis | A01K 97/06 |
| 2019/0150416 A1 * | 5/2019 | Jeffery | A01K 87/04 |
| 2021/0352882 A1 * | 11/2021 | Omura | A01K 97/06 |
| 2024/0074419 A1 * | 3/2024 | Bennis | A01K 97/00 |

* cited by examiner

*Primary Examiner* — Richard G Davis
(74) *Attorney, Agent, or Firm* — Mark L. Maki; Miller Canfield

(57) ABSTRACT

A fishing device with hook storage is provided for use in association with the performance of fishing and other similar activities, and more particularly, to a rod-mountable fishing device configured as a hook keeper exhibiting an integrated aesthetic appearance wherein various features provide for hook storage in multiple configurations.

20 Claims, 22 Drawing Sheets ue and within the line guard. This configuration assures that the lever arm is always biased against the line guard until a user actively pulls or pries the lever arm away from the line guard to open the hook keeper.

FISHING DEVICE WITH HOOK KEEPING FEATURES

CROSS REFERENCE TO RELATED APPLICATIONS

This present application claims priority of U.S. Provisional Patent Application No. 63/507,081, filed Jun. 8, 2023, the disclosure of which is incorporated herein by reference in its entirety.

FIELD OF THE INVENTION

The invention relates to a fishing device for use in association with the performance of fishing and other similar activities, and more particularly, to a rod-mountable fishing device exhibiting an integrated aesthetic appearance and comprising various features providing for hook storage in multiple configurations so that the fishing device serves as a hook keeper.

BACKGROUND OF THE INVENTION

For individuals who fish, various tools such as knives, scissor-like cutters, and knot tying devices may be used to improve the fishing experience. Further, for storage of tied hooks when not fishing, various methods of storing the hook are employed such as hooking the hook onto an existing line guide mounted to the rod, a hook keeper mounted on the rod, or in some cases, embedding the hook into existing rod structure such as a cork handle or other similar material.

One known device is a multi-function fishing tool as disclosed in U.S. Pat. Nos. 11,596,134 B2 and 11,856,933 B2, the disclosures of which are incorporated herein by reference in their entirety. This known fishing tool was developed to provide a more efficient way to keep people fishing and reduce the time it takes to re-rig. That multi-function fishing device is a subcompact line management solution taking the place of larger tools such as knifes, scissors, nippers, etc., which are commonly used when re-rigging. However, some fishing participants might desire a fishing device having less functionality while still providing significant advantages over other conventional fishing devices.

It is an object of the invention to provide an improved fishing device, which overcomes disadvantages associated with known fishing equipment and accessories.

The invention relates to a hook keeper having an integral, one-piece carabiner-like main body, which is readily mountable to a fishing pole to assist with knot tying and the storage of hooks and associated fishing setups.

In one aspect, the main body of the hook keeper may be provided with a relatively smaller attachment hole or aperture on the tail end closest to the angler. The attachment aperture is provided for use as a knot-assist hole to assist in the tying of a knot to attach the fishing line to a hook or lure. This attachment aperture or hole also serves as a knot pull down anchor or storage aperture for removably anchoring the hook on the tail end of the hook keeper when the hook keeper is mounted on a fishing pole and temporarily storing the hook in such position.

The attachment aperture or knot-assist hole opens axially along the direction of the end-to-end length of the hook keeper so that it opens along the length of the rod when mounted thereon. This orientation of the attachment aperture provides improved holding of the hook while a user ties a new knot and pulls it down under line tension. This attachment aperture or knot-assist hole also can be used as another stow point, wherein the point of the hook is shielded inside the body of the hook keeper.

In another aspect, the carabiner-like hook keeper provides the benefits of both a closed, and open style hook keeper since the hook keeper is normally closed but is openable. As such, the hook keeper can, for example, stow a weedless or Texas rigged hook without having to remove the bait or expose the hook. Further, the carabiner-like style of this hook keeper also allows secure storage of a drop shot weight. Still further, the attachment aperture can engage or receive the tip of the hook, wherein the hook shank can be stored in an upright position over the top of the hook keeper or canted down along the side of the hook keeper.

In still another aspect, the hook keeper of the present invention is provided in a relatively small package. The hook keeper in one embodiment may be approximately 0.4" tall, 1.0" long and 0.375" wide although each dimension can be varied relative to the others.

Further, the hook keeper preferably mounts to the rod using only a single attachment band. In a known rod-mountable fishing tool such as that disclosed in U.S. Pat. Nos. 11,596,134 B2 and 11,856,933 B2 (both Cutler et al), multiple attachment bands are provided which bands are tough, and flexible, but also are provided in multiple, different-sized pairs that add cost to the overall product. To reduce manufacturing costs, the hook keeper of the present invention includes an improved mounting configuration of band attachment points so that only a single band is used to attach the hook keeper securely to rods having a range of ¼"-¾" diameter. The attachment band is preferably formed as an endless loop. Further, an attachment band, which is larger in size or has a greater range of stretching, would also allow mounting to larger size rods. Notably, the present invention is not limited to the preferred size range but can be modified as necessary for other size fishing rods.

In the improved mounting configuration, the middle section of the hook keeper actually sits atop or presses down on intermediate sections or portions of the mounting band, so the force of the mounting band actually clamps the hook keeper down onto the band and against the outer surface of the fishing rod, which really helps with "stiction" or clamping so the hook keeper holds onto the rod and the stiction or clamping effect resists movement of the hook keeper along the axial length of the fishing rod. Preferably, the hook keeper sits atop the intermediate portions of the attachment band, and there are channels on the keeper underside to receive sections of the attachment band and help locate and maintain the band sections in place. If the fishing rod has any variability in the diameter along its length, the stretchability of the mounting band automatically adjusts to the rod diameter. This improved mounting configuration allows the hook keeper to rely upon a single mounting or attachment band while still staying firmly in place on the rod.

Still further, the hook keeper has a carabiner arm or lever arm formed along the upper backbone area, which is resiliently deformable or bendable. As such, the lever arm is actually spring loaded or resiliently biased so it is pressing up against a front line guard near the nose end of the hook keeper so that there is no gap between the two parts which thereby prevents a fishing line from accidentally sliding into the keeper through the joint between the lever arm and line guard which can ultimately cause a snag. The spring or restoring force preferably is generated by forming the lever arm so that it is outside of the line guard in an undeformed condition and then deforming or flexing the lever arm inwardly and around the line guard into engagement therewith. The line guard then holds the lever arm in a partially deformed or flexed condition with the lever arm tending to bias outwardly and firmly engage with the line guard. The lever arm is resiliently deflectable and can then be flexed an additional distance inwardly into the hook keeper body to open the joint between the lever arm and line guard as desired by the user.

The hook keeper can be formed by various manufacturing methods and for example, may be printed by a 3D printer into the desired shape, preferably with the lever arm in the undeformed condition described above. After initial printing or other manufacture, the lever arm may be flexed around and to the underside of the line guard so as to remain in the normally closed position. This construction thereby avoids accidental snags or tangles.

The hook keeper is usable with a variety of fishing setups, wherein the fishing line, hooks, and other fishing gear can be arranged in multiple configurations. For example, the hook keeper can readily stow a weedless or Texas rigged setup, wherein the lever arm can be pressed down to insert and remove the hook into the hook keeper without having to pull the bait off the hook.

The hook keeper can also stow a drop shot weight. A known open style hook keeper can accomplish this, however if the line slacks at all (rod bends slightly) with an open keeper, the drop shot weight falls off. With the inventive hook keeper having a lever arm, if the line slacks, the drop shot weight with attached fishing line still stays stowed and remains stowed once the line tightens again.

The lever arm also includes wider thumb pad on the lever, which makes it easier to use. The hook keeper also is formed with an angled guide groove preferably at the front of the main keeper surface. The hook can be hooked around the line guard at the nose end of the hook keeper and the guide groove angles the point of the hook down towards the rod, and not just directly to the side like a standard hook keeper does. This greatly reduces the chance of accidental pokes and snags in carpet, furniture, car upholstery, etc.

The hook keeper may also include a spring arm that is generally shaped as a sideways v shape, which resiliently supports the lever arm. As such, the hook keeper preferably does not only rely upon the resiliency of the lever arm but also is resiliently supported by the deformable spring arm. Further the spring arm serves as another form of hood or shield for shielding the point of the hook when stowed in the knot assist hole. With the compression spring and the wider lever arm, the hook keeper effectively conceals the hook point and should even be able to cover two of the 3 points on a treble hook.

The inventive hook keeper includes a number of unique features, including but not limited to:

Hook guide slot is angled relative to the base of the hook keeper to control the angle the hook is being stowed at.

Knot-assist hole stows the hook so the point is concealed within the interior of the hook keeper.

Lever arm on the hook keeper is configured to define a carabiner arm style that accesses a pocket at the keeper nose to assist in tackle storage such as hook storage and other tackle storage.

Attachment band routing wherein the mounting formations define a circuitous path for a single attachment band such that the compression force of the band is actually pulling the hook keeper against the band. This is effective in helping the hook keeper stay in place on the rod as it increases the surface area of the band contacting the rod.

Routing of the attachment band between the hook keeper and rod surface provides a cushion that reduces the risk of the harder plastic of the hook keeper marring the rod finish.

Forming of the lever arm in an undeformed condition during manufacture, so that when it is put into the "operational" position or in other words, when it is deformed and engaged with the line guard, there is a spring force applied from the material itself, which therefore does not require an externally installed component.

Other objects and purposes of the invention, and variations thereof, will be apparent upon reading the following specification and inspecting the accompanying drawings.

BRIEF DESCRIPTION OF THE DRAWINGS

The invention relates to a multi-function fishing device, of which the following is a Specification, reference being had to the accompanying drawings forming a part hereof.

Figure 1:
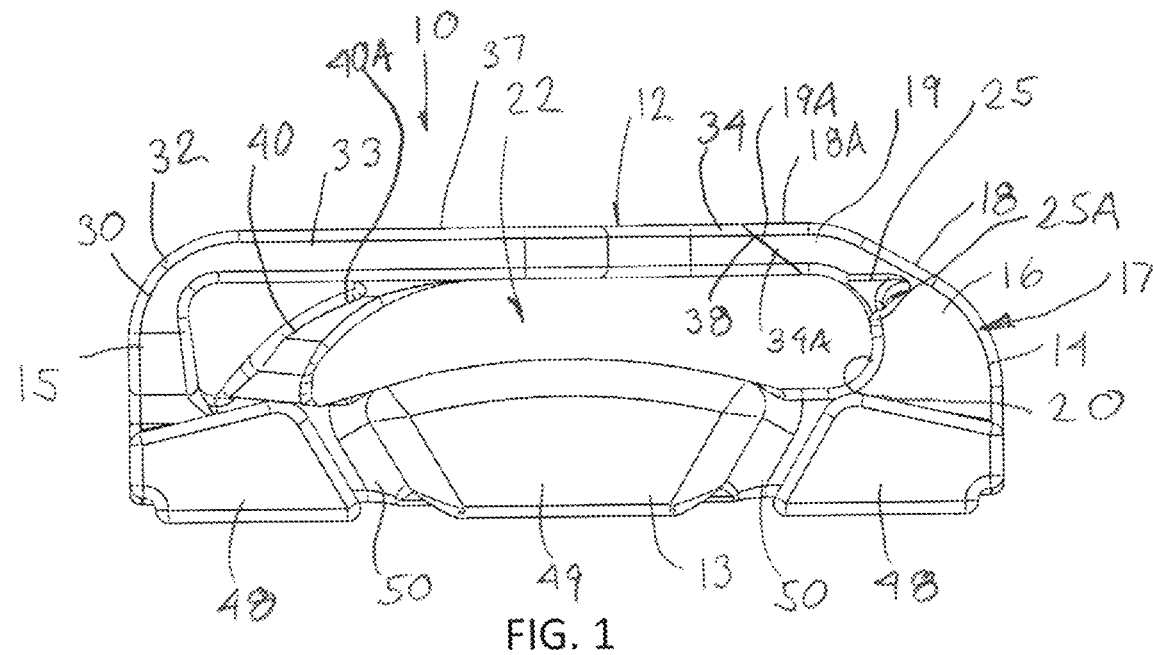
FIG. 1 is a front view of the present invention showing the fishing device or hook keeper of the invention without an attachment band.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIGS. 1-11, a fishing device or hook keeper 10 of the present invention is designed as an improved hook keeper, which is readily mountable to a fishing rod to assist with knot tying and the storage of hooks, other tackle, and associated fishing setups. The fishing device 10 performs multiple functions while providing an aesthetically pleasing design.

Generally, the fishing device 10 includes a main body 12 that is preferably elongated along an axial length so as to have the general shape of a fish. The main body 12 is configured with various features that perform multiple different functions or tasks that are typically performed when the user is fishing. Preferably, the main body is formed of a polymer body or other suitable material that blends strength, durability, resilient deformability and flexibility into one lightweight material. The main body 12 is designed to be "non-mechanical" (no mechanical hinges, mechanical springs, etc.) to increase longevity, and does not become cold to touch and is engineered to withstand repeated exposure to harsh environmental conditions. The main body 12 can be formed through various manufacturing processes including 3D printing thereof.

The fishing device 10 is formed as a hook keeper and includes the main body 12 that is formed with a base 13 extending axially along the end-to-end length of the main body 12, a nose end 14 and a tail end 15. The hook keeper 10 is configured to store hooks and the like as one type of fishing tackle, although it is understood from the following description that the hook keeper 10 is also configured for stowage of other types of tackle other than hooks. The nose end 14 defines an upright end wall 16 that projects upwardly from the base 13 and forms a front line guard 17 oriented toward a rod tip of the fishing rod. The front line guard 17 generally has a narrow width in comparison to a width of the base 13, and curves upwardly and rearwardly to form a front face 18 of the nose end 14. The tail end 15 is oriented away from the rod tip so as to project toward the rod handle.

The front face 18 turns rearwardly toward the tail end 15 to define an upward facing top surface portion 18A that extends along a top wall portion 19. The top wall portion 19 terminates at an inclined wall face 19A that faces toward the tail end 15 and angles downwardly and lengthwise toward the nose end 14.

The front line guard 17 also defines an interior guard face 20 that may have an arcuate curvature to define a pocket 21 that is closed on one side by the interior guard face 20 and is open in the opposite direction to form one end of a hollow keeper interior 22 as will be described in further detail herein. The front line guard 17 is relatively rigid so as to define an upward projection to which a hook or other piece of fishing equipment can be engaged or anchored for storage. Typically, the nose end 14 is oriented toward the tip end of a fishing pole such that a hook 26 (see FIGS. 32-35) would be pulled against the interior guard face 20 by tension in the fishing line.

Figure 2:
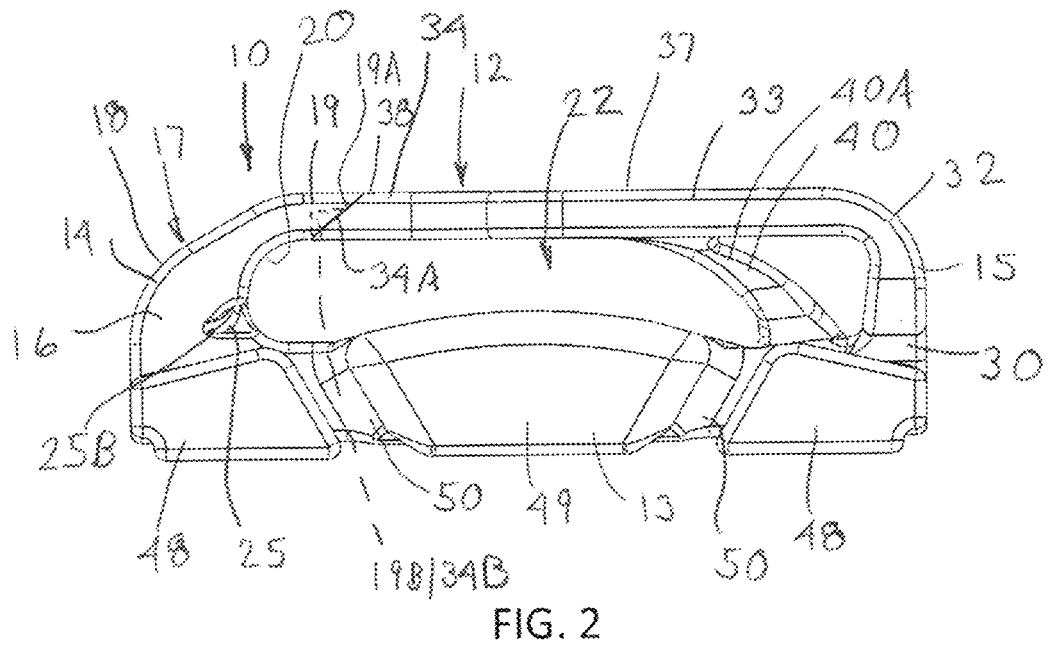
FIG. 2 is a rear view thereof.
Figure 3:
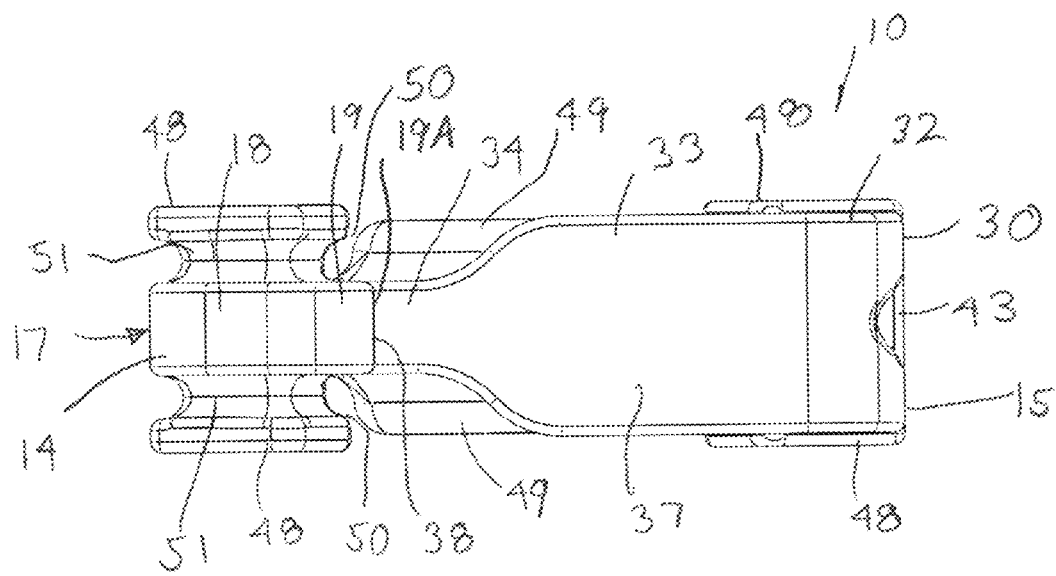
FIG. 3 is a top view thereof.
Figure 4:
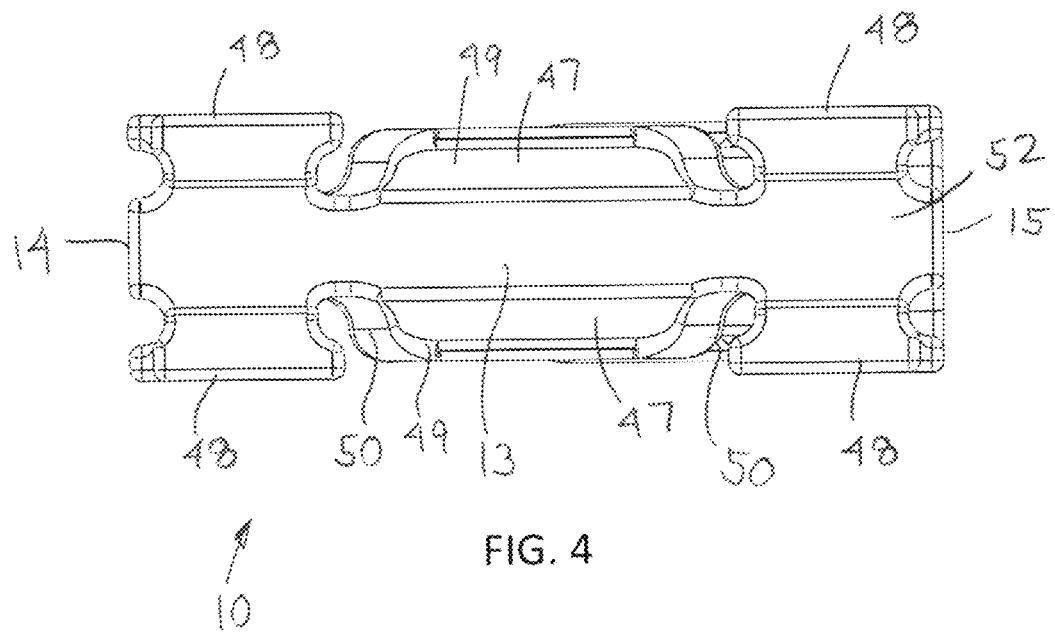
FIG. 4 is a bottom view thereof.
Figure 5:
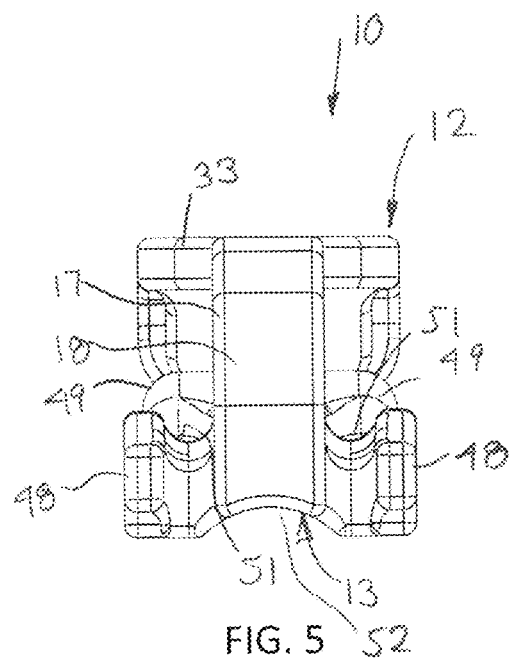
FIG. 5 is a right side elevational view viewed from a nose end of the hook keeper.
Figure 6:
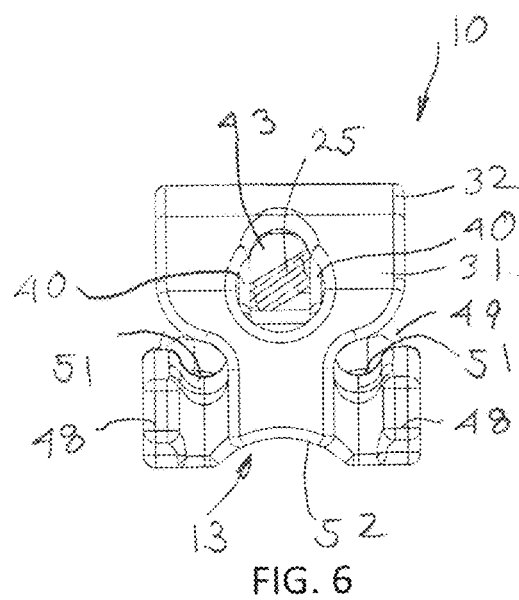
FIG. 6 is a left side elevational view viewed from a tail end thereof.
Figure 7:
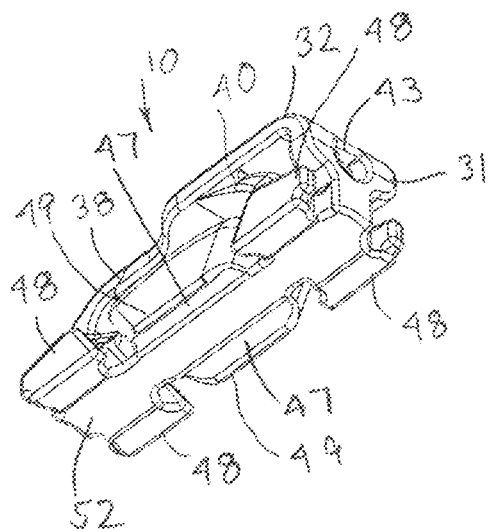
FIG. 7 is a perspective view as taken from the bottom left thereof.
Figure 8:
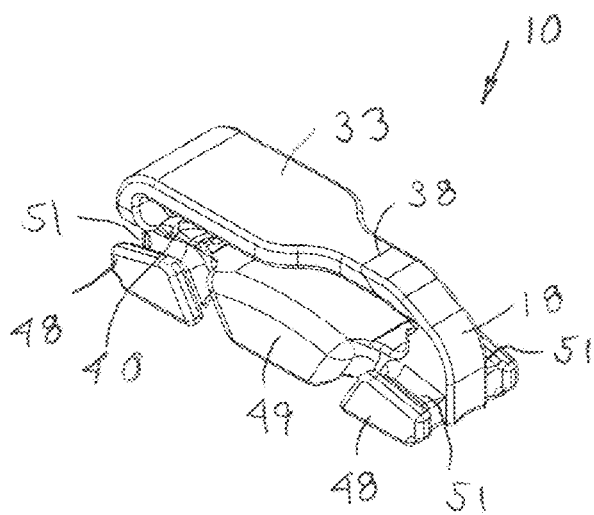
FIG. 8 is a perspective view as taken from the top right thereof.
Figure 9A:
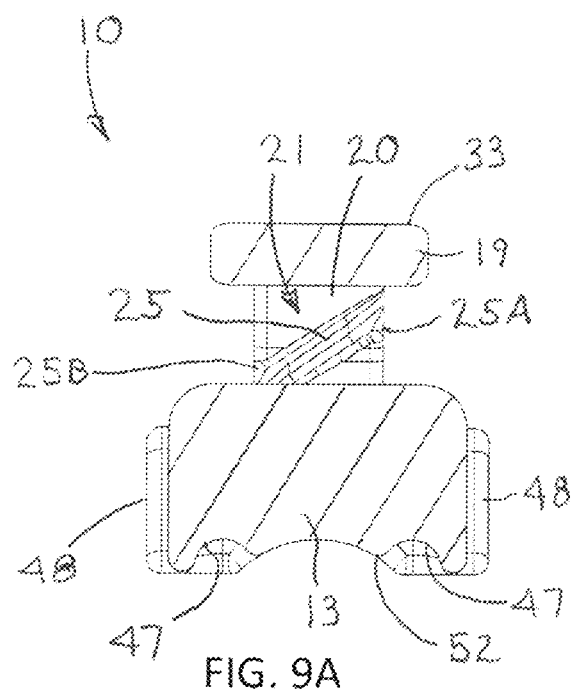
FIG. 9A is an enlarged end cross-sectional view thereof as viewed toward the nose end.

To facilitate storage of hooks and the like, the interior guard face 20 preferably is formed with an angled guide groove 25 (see FIGS. 1, 2 and 9A). In this embodiment, the guide groove 25 is angled down and to the left when viewed in FIG. 9A, although the orientation may be reversed or modified. More particularly, the guide groove 25 can angle downwardly from the groove end 25A to the groove end 25B. As will be described in greater detail relative to FIGS. 32-35, a hook 26 can be hooked around the nose portion or end 14 of the hook keeper 10 such that the guide groove 25 angles the point 26A and bend 26B of the hook 26 down towards the rod 27, and not just directly to the side. This greatly reduces the chance of accidental pokes and snags in carpet, furniture, car upholstery, etc.

The hook keeper 10 also includes the tail end 15 defined by an upright end wall 30 projecting upwardly from the tail end of the base 13. The end wall 30 defines an end face 31 extending upwardly to define an upper corner 32. The end wall 30 typically faces away from the rod tip and is narrow at the base 30 and then expands in width so that the width of the upper portion of the end wall 30 is proximate to the total width of the base 13. Hence, the central portion of the end wall 30 is wide and faces in the lengthwise direction away from the nose end 14 preferably towards the rod handle. Considering that the hook keeper 10 has a lengthwise axis extending between the nose end 14 and tail end 15, it can be said the end face 31 faces axially away from the hook keeper 10.

The end wall 30 may be able to flex relative to the base 13 due to resilient flexing of the hook keeper material. The upper corner 32 is formed integrally as one-piece with a carabiner arm or lever arm 33 projecting therefrom, wherein the lever arm 33 is formed along an upper backbone area of the hook keeper 10 and overlies the base 13. The lever arm 33 is resiliently deformable and extends forwardly to define an upper side of the keeper interior 22 by a lever arm face. The lever arm 33 has a terminal end 34 that extends into contact with the top wall portion 19 of the line guard 17, so that the lever arm face is substantially flush with said interior guard face 20 to prevent the fishing line from slipping through said interface when closed and not gap is present.

More particularly, the terminal end 34 defines a declined end face 34A that faces toward the nose end 14 and angles upwardly and lengthwise toward the tail end 15 so as to form a shape complementary to the end face 19A and abut in contact therewith in the condition shown in FIGS. 1 and 2. These opposing end faces 19A and 34A are normally in abutting contact in the condition illustrated but are separable away from each other by deflecting the lever arm 33 downwardly toward the base 13, which creates or opens a gap between these opposing end faces 19A and 34A for management and insertion of fishing lines, hooks and the like into the hollow keeper interior 22. The material of the lever arm 33 is resiliently deformable downwardly under pressure and then returns to the storage condition of FIGS. 1-8 when the pressure is released.

The wide width of the lever arm 33 results in the lever arm 33 including a wide thumb pad or actuation pad 37 extending along most of the length of the lever arm 33 which makes it easier to use. Further, the lever arm 33 then narrows beyond the actuation pad 37 to match the width of the line guard 17 at the top wall portion 19.

Figure 21:
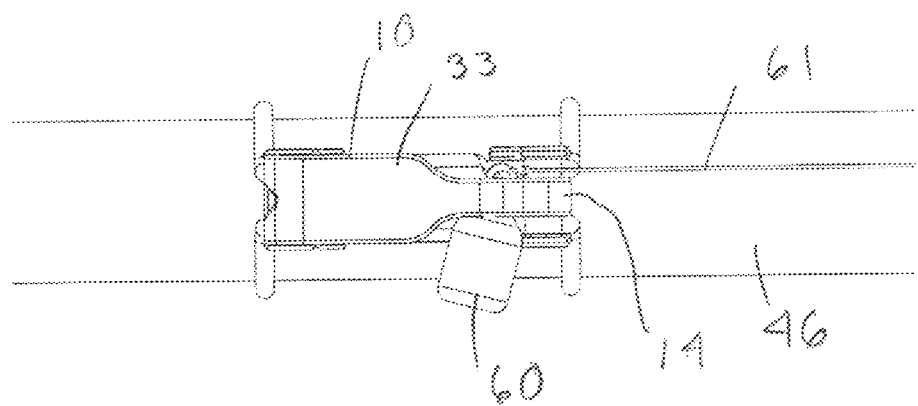
FIG. 21 is a top view of the fishing device storing a drop shot weight at the nose end of the fishing device.
Figure 22:
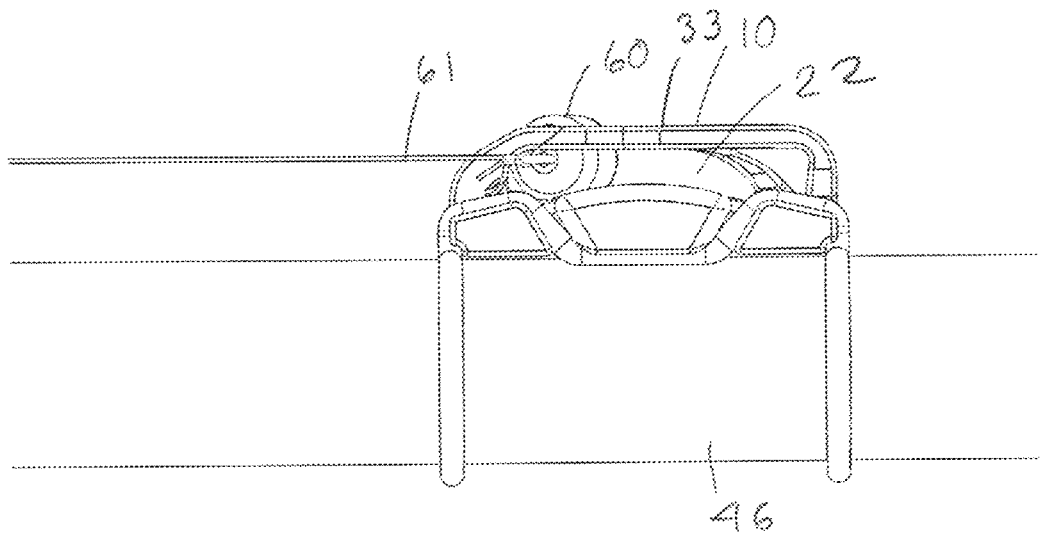
FIG. 22 is a rear side view of the fishing device storing a drop shot weight at the nose end of the fishing device.
Figure 23:
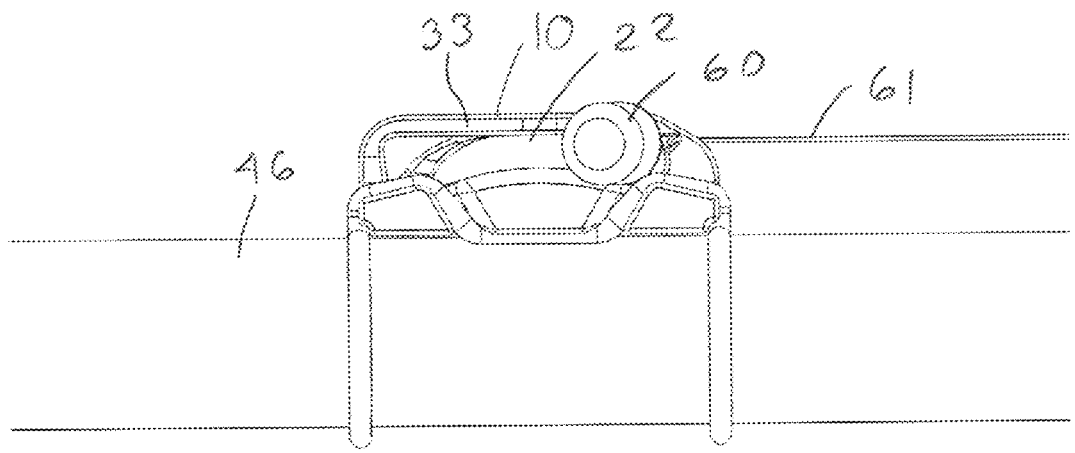
FIG. 23 is a front side view of the fishing device storing a drop shot weight at the nose end of the fishing device.
Figure 24:
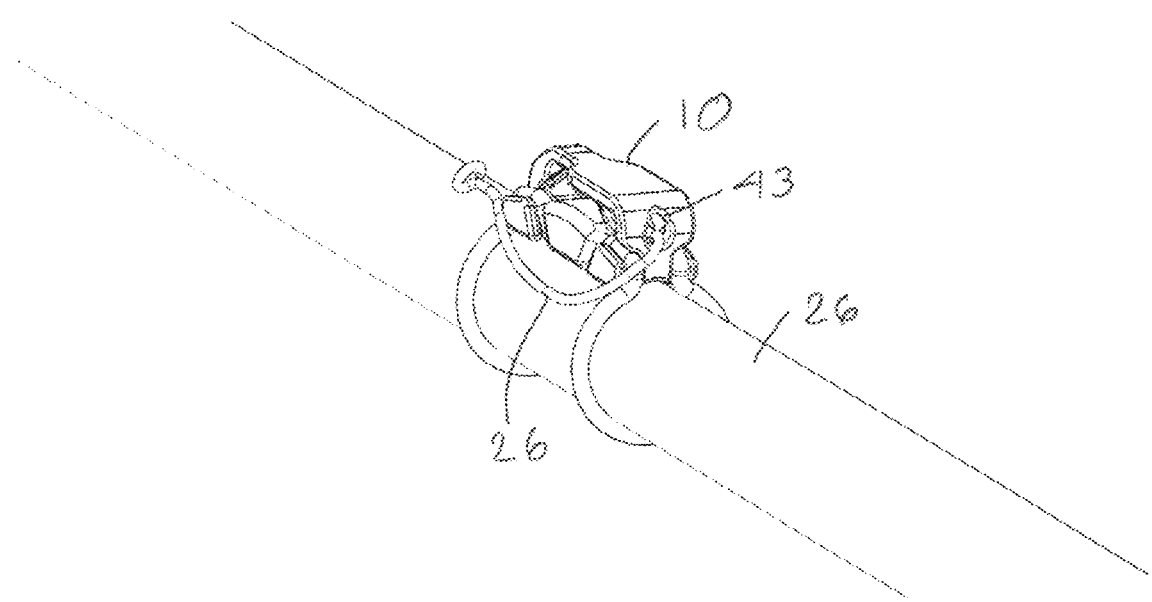
FIG. 24 is a tail end perspective view of the fishing device storing a hook in a canted position in a knot-assist hole at the tail end of the fishing device.
Figure 25:
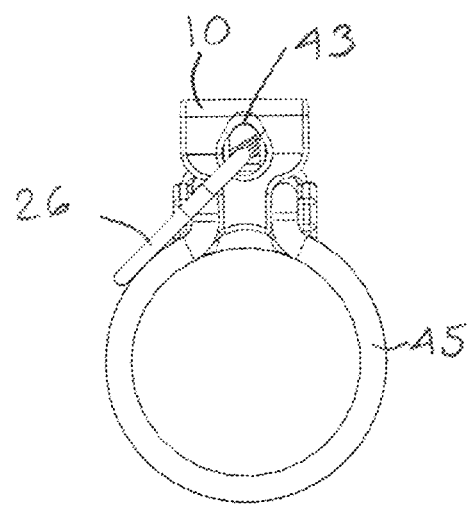
FIG. 25 is a tail end view of the fishing device storing a hook in a canted position in a knot-assist hole at the tail end of the fishing device.
Figure 26:
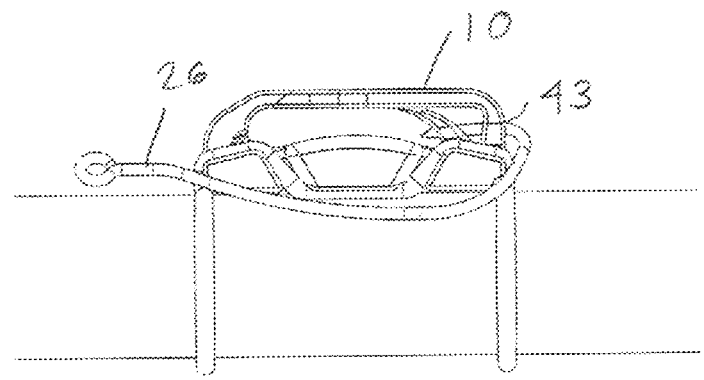
FIG. 26 is a rear side view of the fishing device storing a hook in a canted position in a knot-assist hole at the tail end of the fishing device.
Figure 27:
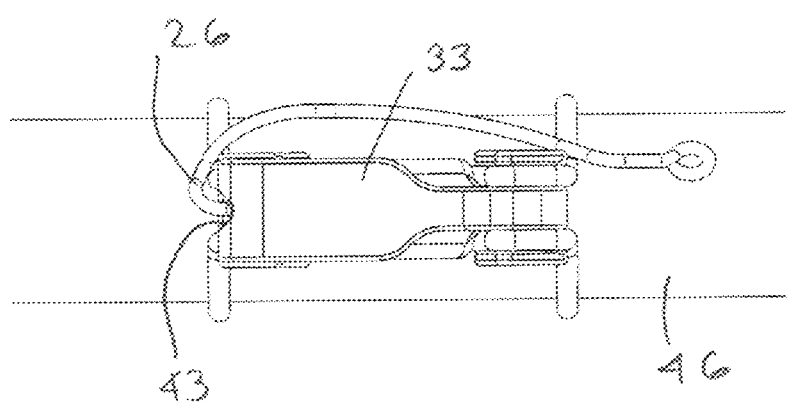
FIG. 27 is a top view of the fishing device storing a hook in a canted position in a knot-assist hole at the tail end of the fishing device.
Figure 28:
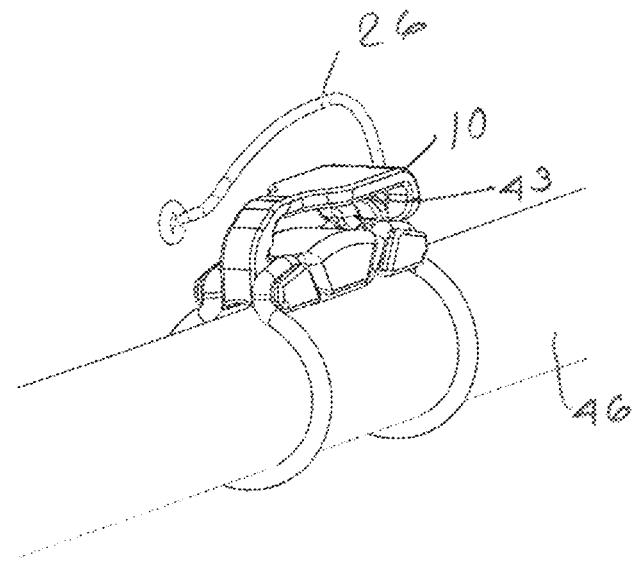
FIG. 28 is a nose end perspective view of the fishing device storing a hook in an overhead position at the tail end.
Figure 29:
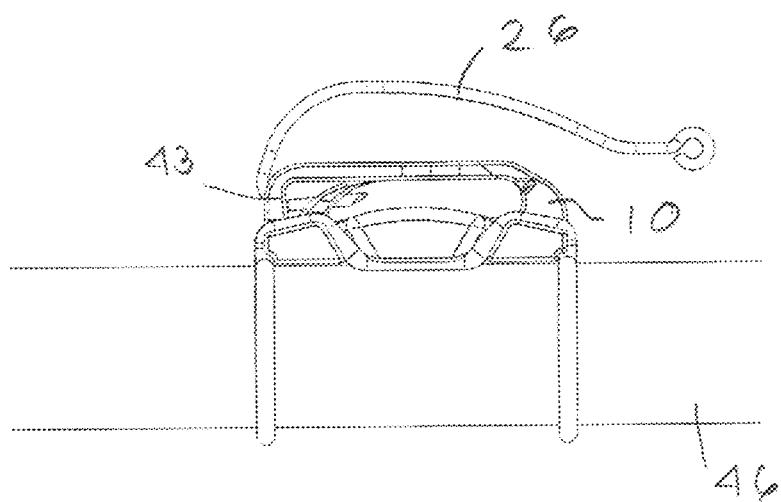
FIG. 29 is a front side view of the fishing device storing a hook in an overhead position at the tail end.
Figure 30:
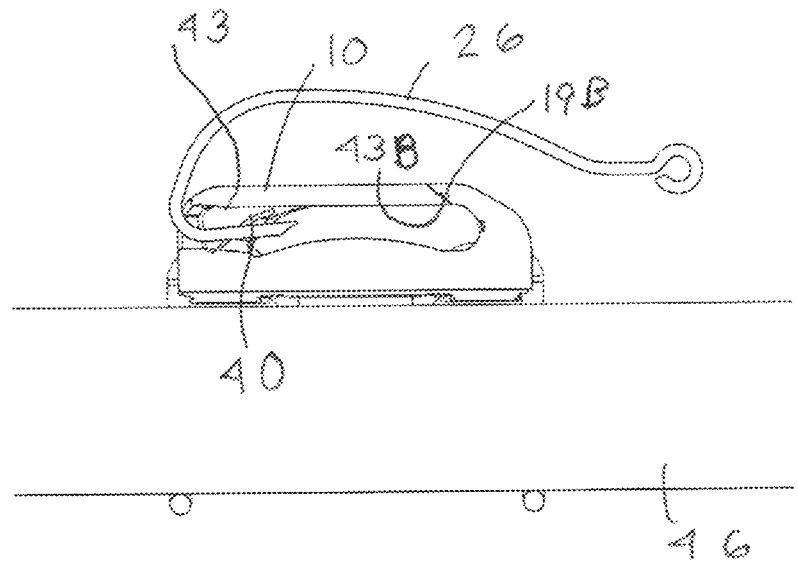
FIG. 30 is a rear side cross-sectional view of the fishing device storing a hook in an overhead position at the tail end.
Figure 31:
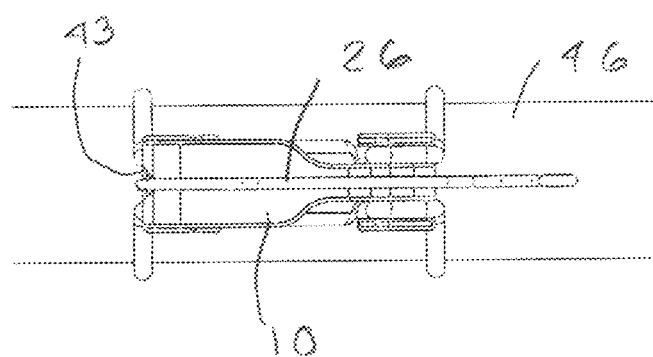
FIG. 31 is a top view of the fishing device storing a hook in an overhead position at the tail end.
Figure 32:
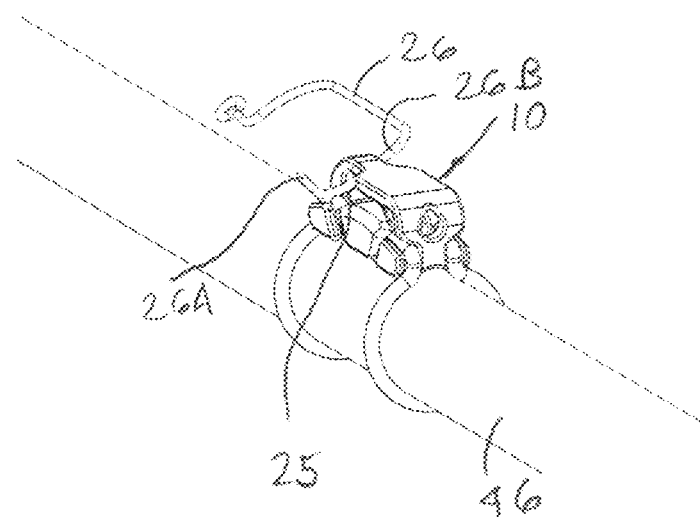
FIG. 32 is a perspective view of the fishing device storing a hook in an angled position using a guide groove at the nose end.
Figure 33:
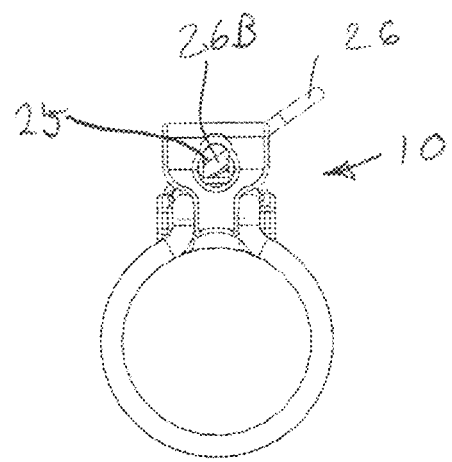
FIG. 33 is a tail end view of the fishing device storing a hook in an angled position using a guide groove at the nose end.
Figure 34:
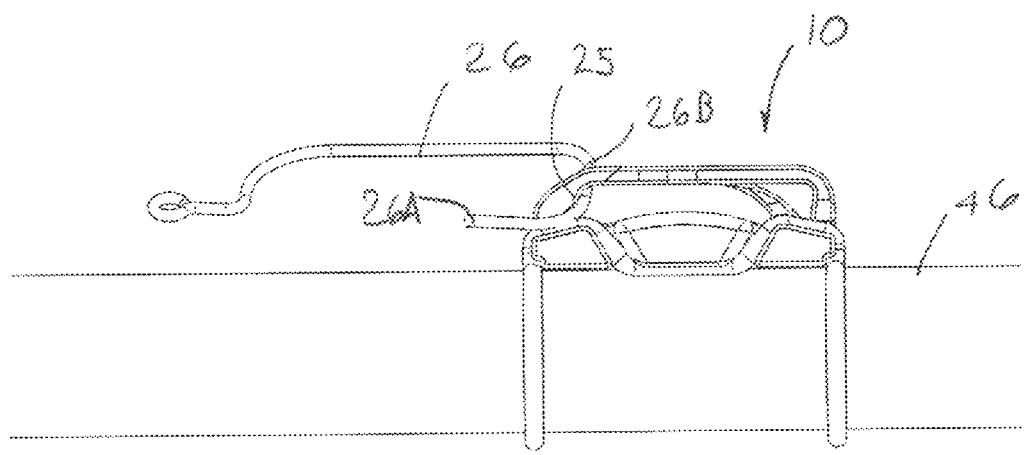
FIG. 34 is a rear side view of the fishing device storing a hook in an angled position using a guide groove at the nose end.
Figure 35:
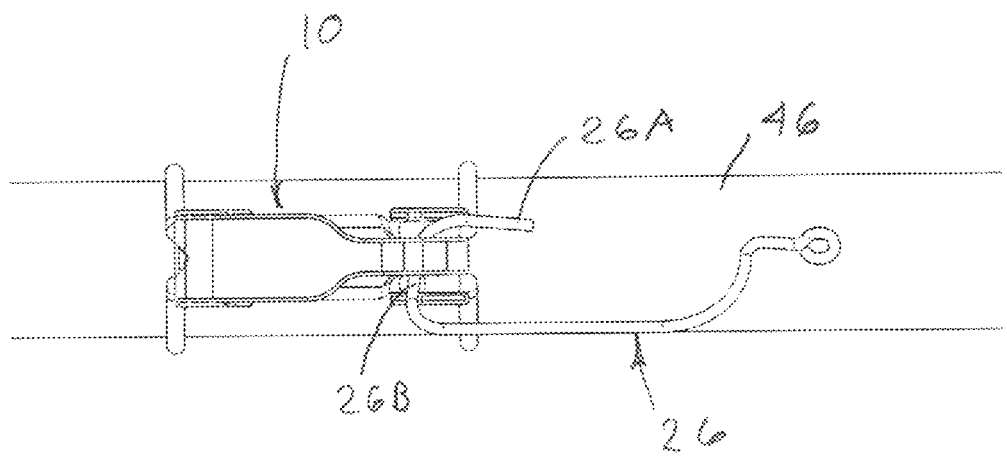
FIG. 35 is a top view of the fishing device storing a hook in an angled position using a guide groove at the nose end.
Figure 36:
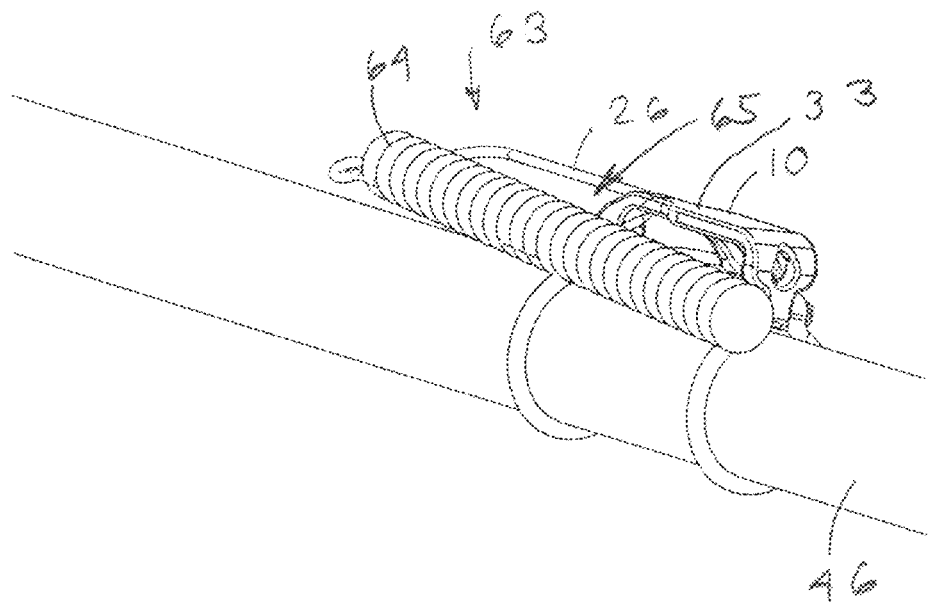
FIG. 36 is a tail end perspective view of the fishing device storing the hook of a weedless or Texas rig using the guide groove at the nose end.
Figure 37:
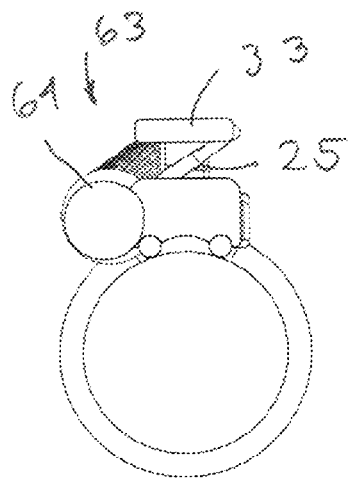
FIG. 37 is a cross-sectional tail end view of the fishing device storing the hook of a weedless or Texas rig using the guide groove at the nose end.
Figure 38:
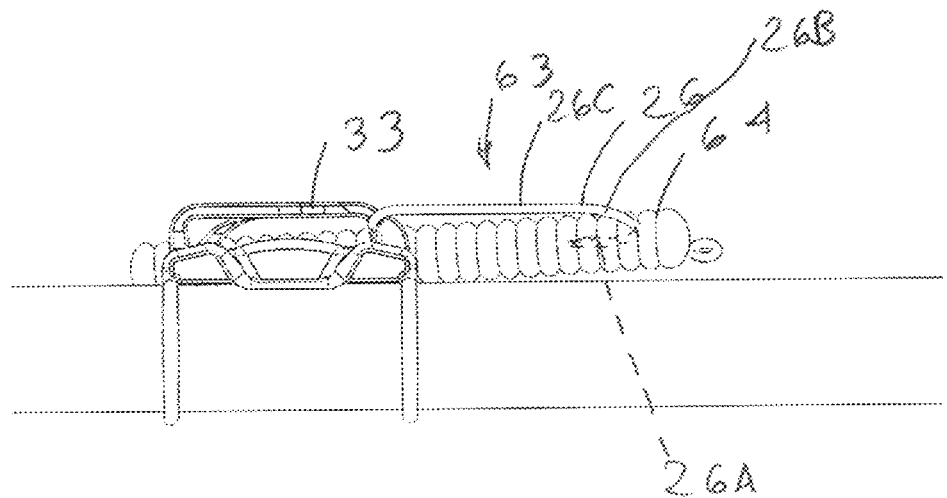
FIG. 38 is a rear side view of the fishing device storing the hook of a weedless or Texas rig using the guide groove at the nose end.
Figure 39:
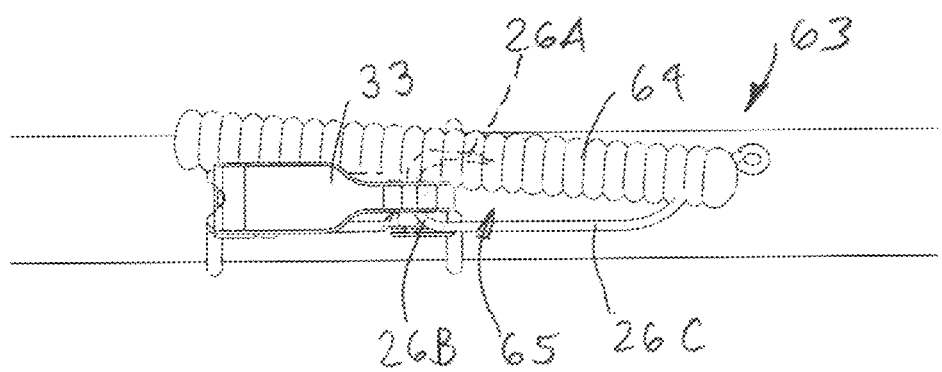
FIG. 39 is a top view of the fishing device storing the hook of a weedless or Texas rig using the guide groove at the nose end.

While the lever arm 33 itself is resiliently deflectable and tends to bias itself to the normal closed position of FIG. 21, the lever arm 33 can include additional biasing or spring loading so it is pressing with additional force against the end face 19A on the line guard 17. This works to prevent formation of the gap between the two opposing parts or end faces 19A and 34A, which thereby prevents a fishing line from accidentally sliding into the hook keeper 10 through the joint 38 between the lever arm and line guard which can ultimately cause a snag.

Preferably, the hook keeper 10 may also include a spring arm or biasing member 40 as best seen in FIGS. 1 and 2. The spring arm 40 is generally shaped as a sideways curve or alternatively as a v shape or other shape which resiliently supports the lever arm 33. The top and bottom ends of the spring arm 40 are fixed at the base 13 and lever arm 33 wherein an intermediate spring arm section 40A can resiliently flex to permit and yet resist flexing of the lever arm 33 during opening of the interface 38. The spring arm 40 also generates a restoring force tending to bias the lever arm 33 upwardly back to the normally closed position. The spring arm 40 is shaped such as by the arcuate shape shown or a V-shape to facilitate flexing of the spring arm 40 when opening the hook keeper 10. As such, the hook keeper 10 preferably does not only rely upon the resiliency of the lever arm 33 but also is resiliently supported by the deformable spring arm 40. The spring arm 40 may be formed as a single piece or may include an aperture or slot in the middle to accommodate the hook point 26A of a stored hook. The spring arm 40 serves as another form of hood or shield for shielding the point 26A of the hook 26 when stowed in the tail end 15 of the hook keeper 10 as will be described below. With the spring arm 40 and lever arm 34, the hook keeper 10 effectively conceals the hook point 26A and should even be able to cover two of the three points on a treble hook.

In more detail as to the lever arm 33, the spring or restoring force preferably is generated by forming the lever arm 33 so that it is outside of the top wall 19 of the line guard 19 in an undeformed condition and then the lever arm 33 is deformed or flexed downwardly and outwardly which displaces the lever arm 33 inwardly toward the base 13 and around the top wall portion 19 of the line guard 17 into mating engagement therewith. The line guard 17 then holds the lever arm 33 in a partially deformed or flexed condition with the lever arm 33 tending to bias outwardly and firmly in engagement with the line guard 17. The lever arm 33 is resiliently deflectable and can then be flexed an additional distance inwardly into the hook keeper body 12 to open the joint 34A between the lever arm 33 and line guard 17 as desired by the user.

Figure 9C:
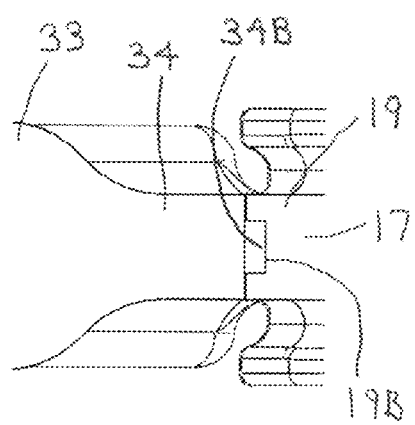
FIG. 9C is a top view of an undeformed lever arm during manufacture.
Figure 9B:
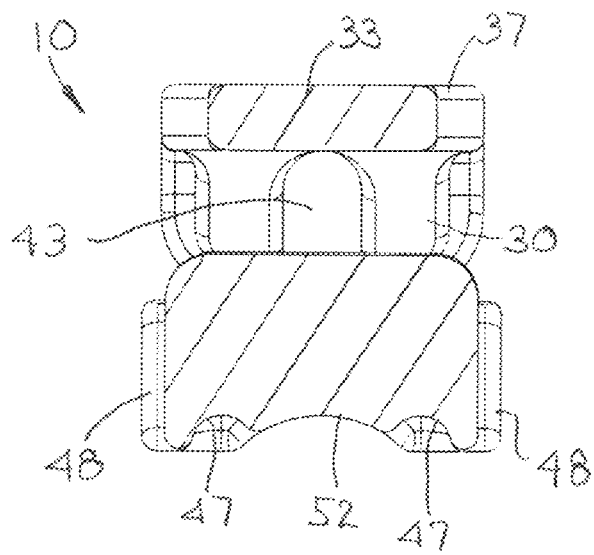
FIG. 9B is an enlarged cross-sectional view thereof as viewed toward the tail end.
Figure 9D:
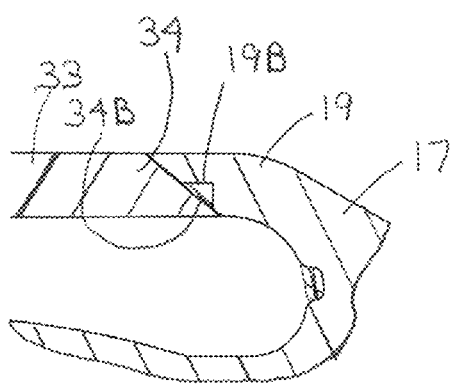
FIG. 9D is a side cross-sectional view of the lever arm after deformation into the normal closed position.
Figure 10:
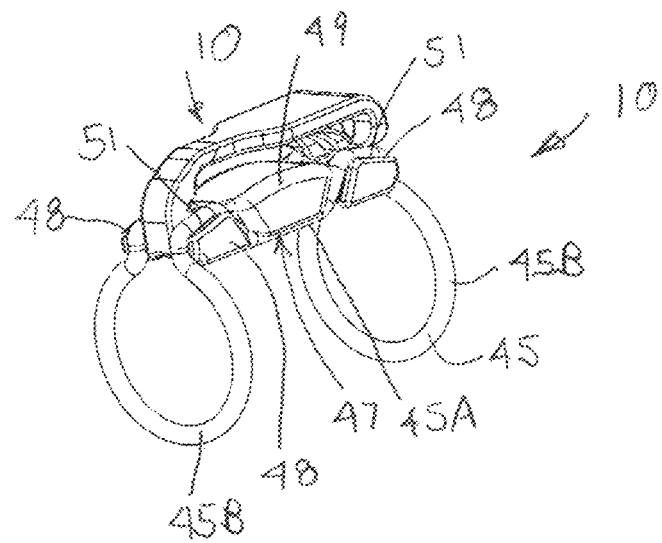
FIG. 10 is an enlarged perspective view of the fishing device shown with a mounting or attachment band routed as if mounted on a fishing rod.
Figure 11:
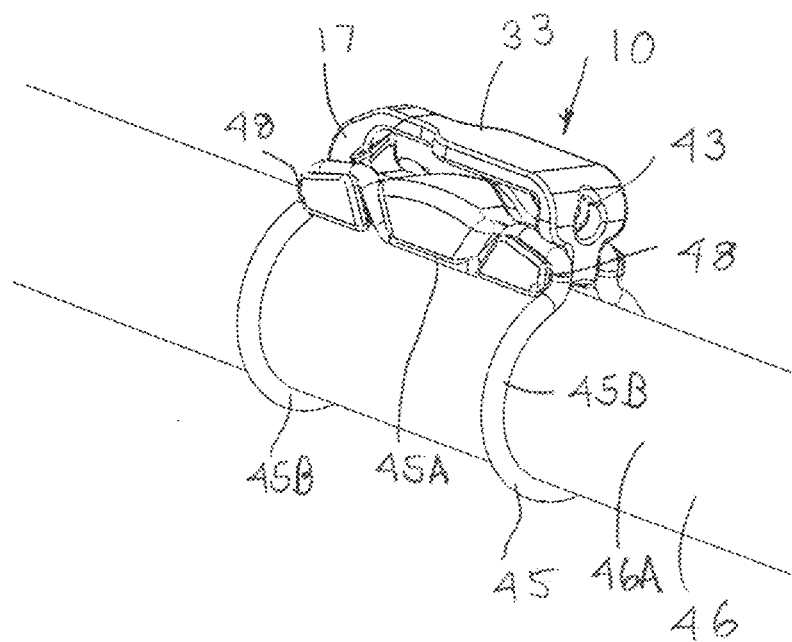
FIG. 11 is a perspective view of the fishing device mounted on a fishing rod or other rod-like structure.

Referring to FIGS. 9C and 9D, the opposing surfaces 19A and 34A preferably include mating alignment or lock formations 19B and 34B, which may be in the form of a projection and notch. The alignment formations 19B and 34B fit together to align the lever arm 33 and line guard 17 in the widthwise direction and prevent inadvertent, widthwise separation of these structures. In this condition, the interior line guard face 20 and the interior lever arm face are aligned at least substantially flush with each other, while the alignment formation 19B and 34B also span the interface to also help block sliding of the fishing line or hook through the interface even if the fishing line or hook were able to force themselves between the surfaces 19A and 34A.

As noted, the hook keeper 10 can be formed by various manufacturing methods and for example, may be printed by a 3D printer into the desired shape, preferably with the lever arm 33 being printed in the undeformed condition described above. After initial printing or other manufacture, the lever arm 33 may be flexed around and to the underside of the line guard 17 to engage the alignment formations 19B and 34B. This construction thereby avoids accidental snags or tangles of fishing equipment.

To provide for additional hook management and stowage, the main body 12 of the hook keeper 10 may be provided with a relatively small attachment hole or aperture 43 (see FIGS. 6, 7 and 9B) on the tail end 15 closest to the angler holding the fishing rod. The attachment aperture 43 is provided for use as a knot-assist hole to assist in the tying of a knot to attach the fishing line to a hook 26, lure or the like.

This attachment aperture or hole 43 also serves as a knot pull down anchor or storage aperture for removably anchoring the hook 26 on the tail end 15 of the hook keeper 10 when the hook keeper 10 is mounted on a fishing rod and temporarily storing the hook 26 in such position.

The attachment aperture or knot-assist hole 43 opens axially along the end-to-end length of the hook keeper 10 so that it opens in a direction oriented along the length of the rod when mounted thereon. This orientation of the attachment aperture 43 provides improved holding of the hook 26 while a user ties a new knot and pulls it down into the attachment aperture 43 under tension by the fishing line. This attachment aperture or knot-assist hole 43 also can be used as another stow point, wherein the point of the hook 26 is shielded inside the body of the hook keeper 10 as described below.

Next as to the base 13, the hook keeper 10 preferably mounts to the rod 46 using only a single attachment band or mounting band 45 (FIGS. 10-17), which serves as a connector member. The hook keeper 10 includes an improved mounting configuration of band attachment points so that only a single mounting band 45 is used to attach the hook keeper securely to a fishing rod 46, including different sized rods 46 having a range of ¼"-¾" diameter. An attachment band 45, which is larger in size or has a greater range of stretching, would also allow mounting to larger size rods. Notably, the present invention is not limited to the preferred size range but can be modified as necessary for other size fishing rods.

Figure 12:
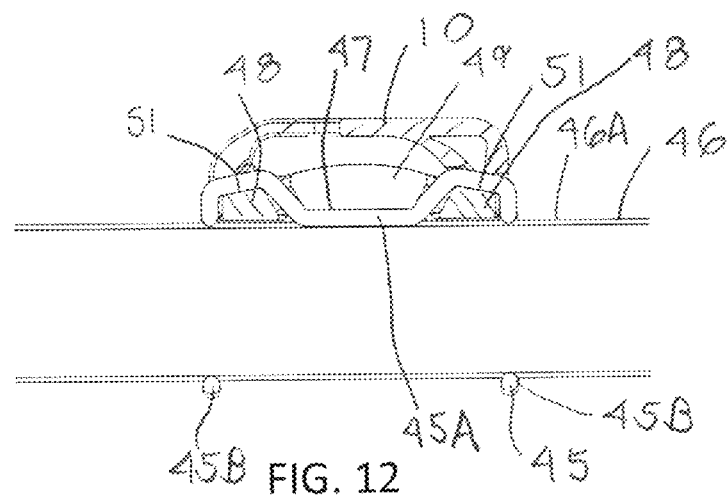
FIG. 12 is a side cross-sectional view of the fishing device in use on a rod.
Figure 13:
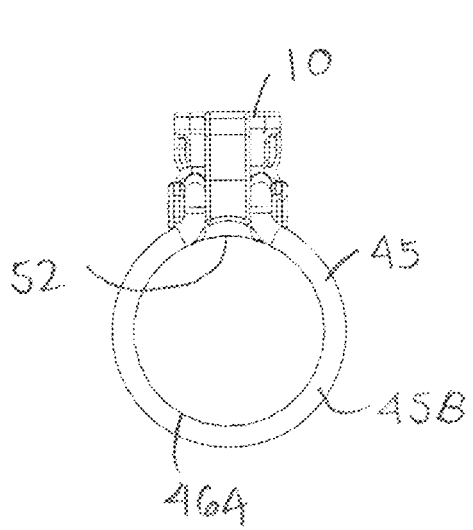
FIG. 13 is a right end view of the fishing device with the attachment band routed as if mounted on a fishing rod.
Figure 14:
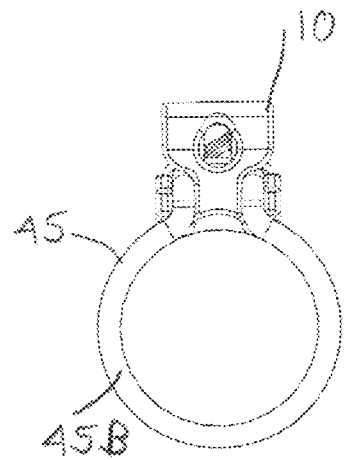
FIG. 14 is a left end view of the fishing device with the attachment band routed as if mounted on a fishing rod.

In the improved mounting configuration, the middle section of the hook keeper 10 actually sits atop or presses down on sections 45A of the mounting band 45, so the force of the mounting band 45 actually clamps the hook keeper 10 down onto these portions 45A of the band 45 captured against the outer surface 46A of the fishing rod (see FIG. 12). This band force helps with "stiction" or clamping so the hook keeper 10 holds onto the rod 46 and the stiction or clamping effect resists movement of the hook keeper 46 along the axial length of the fishing rod 46. Preferably, the base 13 of the hook keeper 10 sits atop of the middle portions 45A of the attachment band 45, and includes mounting band routing channels 47 on the keeper underside that receive the portions or sections 45A of the attachment band 45 and help locate and maintain the band sections 45A in place. If the fishing rod 46 has any variability in the diameter along its length, the stretchability of the mounting band 45 automatically adjusts to the rod diameter. This improved mounting configuration allows the hook keeper 10 to rely upon a single mounting band 45 while still staying firmly in place on the rod 46.

In more detail, the hook keeper 10 is rod-mountable and may be mounted and removed from any fishing rod 46. The main body 12 is formed with an improved versa-mount system defined by connector formations that may be formed as a plurality and preferably four first connector blocks 48 on the bottom edges of the main body 12. The connector formations also comprise two second connector blocks 49 located on opposite sides of the main body 12 and with each second connector block 49 being centrally between two of the first connector blocks 48.

On each keeper side, the two first connector blocks 48 and the second connector block 49 are separated by slots or passages 50 that allow the mounting band 45 to be routed therethrough. The top surfaces of each first connector block 48 includes a band routing channel 51, while the second connector blocks 49 are undercut by the band routing channels 47 that receive band portions 45A. As such, the single mounting band 45 can thread up and over the first connector blocks 48 in the channels 51 and route down and under the second connector blocks 49 through the channels 47 so as to be routed in a circuitous path as seen in FIGS. 10-17.

The first and second connector blocks 48 and 49 thereby anchor portions of the mounting band 45, which may be formed as a resilient O-ring to allow the O-ring to wrap about the fishing rod to mount the hook keeper 10 in position. In effect, the first and second connector blocks 48 and 49 anchor portions of the mounting band 45 and also form circular loops 45B that wrap about the rod surface 46A as seen in FIGS. 10-17. When secured in place, the base 13 of the hook keeper 10 presses or clamps down on the band portions 45A. As such, the hook keeper 10 can attach anywhere and go anywhere. For example, the user can vary the axial position of the hook keeper 10 along the length of a rod 46, such as near the handle and in front or back of the reel, and the radial position around the circumference of the rod 46.

Figure 15:
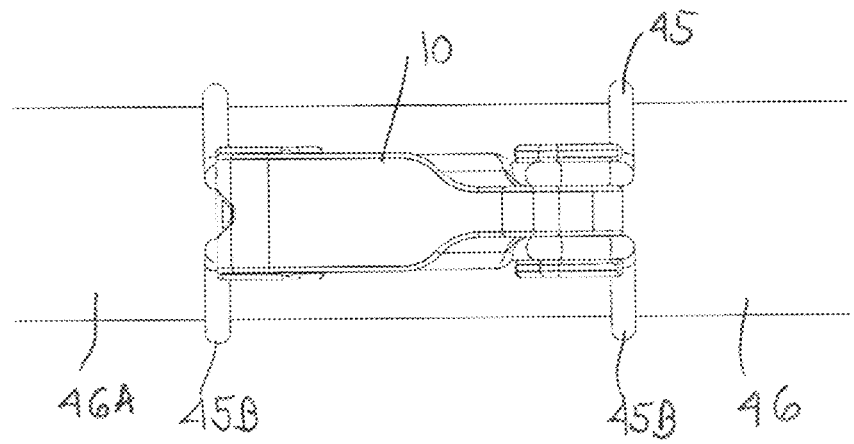
FIG. 15 is a top view of the fishing device mounted on a fishing rod.
Figure 16:
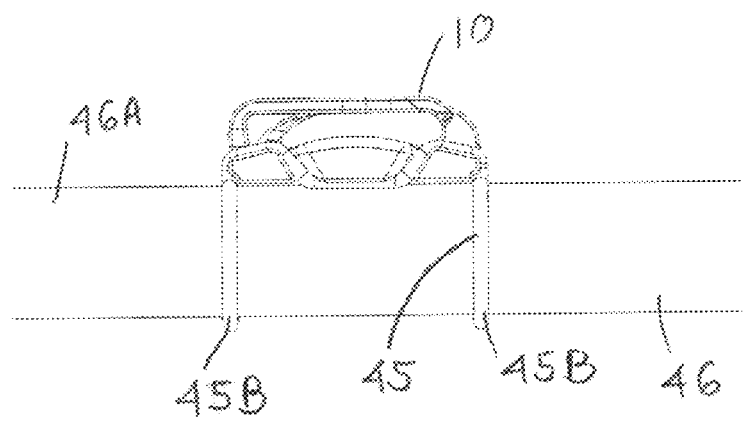
FIG. 16 is a front view thereof.
Figure 17:
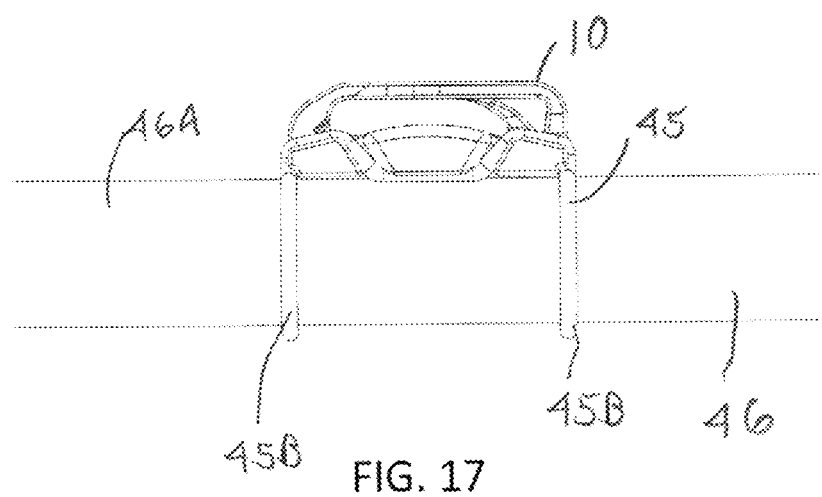
FIG. 17 is a rear view thereof.
Figure 18:
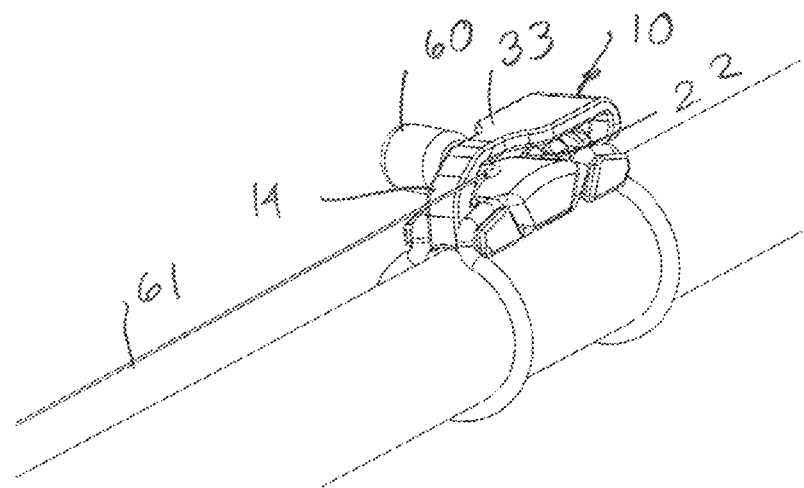
FIG. 18 is nose end perspective view of the fishing device storing a drop shot weight at the nose end of the fishing device.
Figure 19:
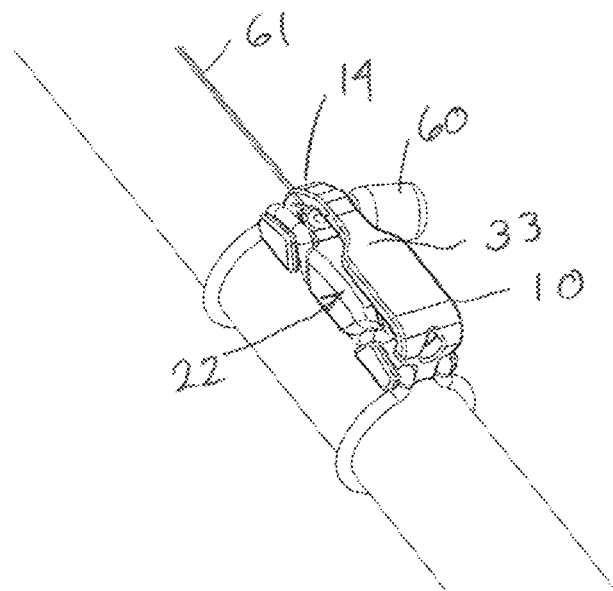
FIG. 19 is a tail end perspective view of the fishing device storing a drop shot weight at the nose end of the fishing device.
Figure 20:
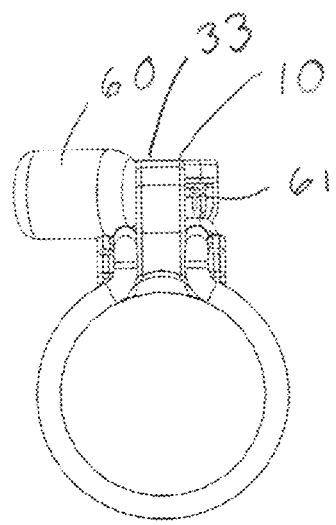
FIG. 20 is a nose end view of the fishing device storing a drop shot weight at the nose end of the fishing device.

As noted, the hook keeper 10 is removably mountable to a fishing rod 46 by the connector formations configured in the form of the connector blocks 48 and 49. This is an improved four point attachment system that works in conjunction with a concave base surface 52 provided on the base 13 as seen in FIGS. 5-7 and 13 to eliminate lateral torsion on rod 46 and maintain the hook keeper 10 in axial alignment with the rod axis (FIG. 15).

This provides tight fitting attachment of the hook keeper 10 on the rod 46 at virtually any axial position and virtually any radial position about the rod circumference. Preferably, the hook keeper 10 is sold with a single mounting band 45 of single size, although other sizes might be provided such as single mounting bands 45 of small, medium, and large to accommodate nearly all rod diameters, wherein the mounting bands 45 and are nearly indestructible and hold up to the harshest weather extremes. This attachment method also is non marring.

By the present invention, the hook keeper 10 is provided in a relatively small package. The hook keeper 10 in one embodiment may be approximately 0.4" tall, 1.0" long and 0.375" wide although each dimension can be varied relative to the others. The hook keeper 10 can securely mount to a rod blank (in front of reel or behind reel on split grips) such as by using the mounting band 45, and can also mount on zippers of clothing and tackle bags, zingers, lanyards, keychains, etc. such as by using connectors looped through the openings.

The hook keeper 10 is usable with a variety of fishing setups, wherein the fishing line, hooks, and other fishing gear can be arranged in multiple configurations.

For example, FIGS. 18-23 are perspective, end, top, rear side and front side views of the fishing device storing a drop shot weight 60 at the nose end 14 of the hook keeper 14. The hook keeper 10 is able to stow the drop shot weight 60 with the fishing line 61 extending through the opening 22. A known open style hook keeper can accomplish this, however if the line slacks at all (rod bends slightly) with an open keeper, the drop shot weight falls off. With the inventive hook keeper 10 having a lever arm 33, if the line slacks, the drop shot weight 60 with attached fishing line 61 still stays stowed and remains stowed once the line 61 tightens again. The line 61 is inserted and removed from the open interior 22 by flexing the lever arm 33.

As noted above, the knot assist opening 43 can be used to support and stow a hook 26 particularly when tensioned by a fishing line 61. For example, FIGS. 24-27 are perspective, tail end, rear side and top views of the hook keeper 10 storing a hook 26 in a canted position in the knot-assist hole 43 at the tail end 15 of the hook keeper 10. In the alternative, FIGS. 28-31 are perspective, front side, rear side and top views of the hook keeper 10 storing a hook 26 in an overhead position at the tail end 15.

As noted above, the hook 26 can also be stored on the line guard 17 at the nose end 14 of the hook keeper 10. FIGS. 32-35 are perspective, tail end, rear side and top views of the hook keeper 10 storing the hook 26 in an angled position using the guide groove 25 to orient or angle the hook 26 relative to the hook keeper 10.

In another example, the hook keeper 10 can readily stow a weedless or Texas rigged setup 63, which typically comprises a line-attached hook 26 in combination with a bait 64, such as an artificial bait having a worm-like shape. The hook point 26A is embedded in the bait 64 wherein the shank 26C and bend 26B form a loop or opening 65. The lever arm 33 can be pressed down to insert and remove the hook 26 into the hook keeper 10 as shown without having to pull the bait off the hook. FIGS. 36-39 are perspective, cross-sectional end, rear side and top views of the hook keeper 10 storing the hook 26 of the weedless or Texas rig 63 using the guide groove 25 at the nose end 14 to angle the hook 26 when stowed.

Figure 40:
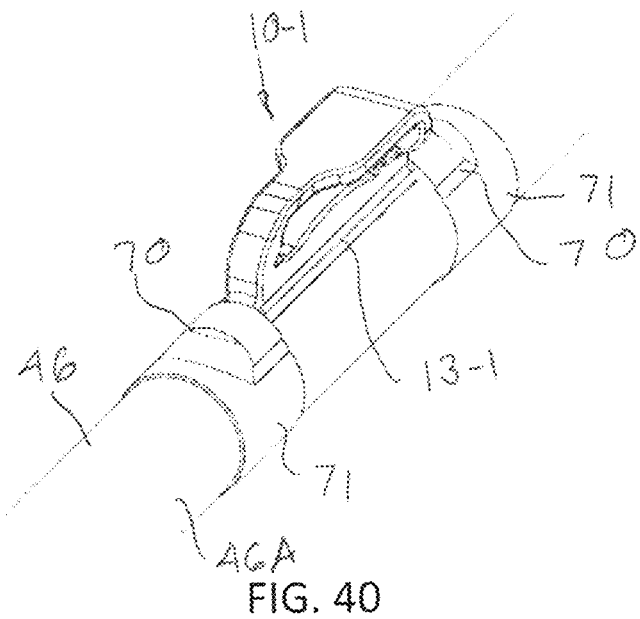
FIG. 40 is a nose end perspective view of a second embodiment of the fishing device of the present invention having an alternate mounting arrangement.
Figure 41:
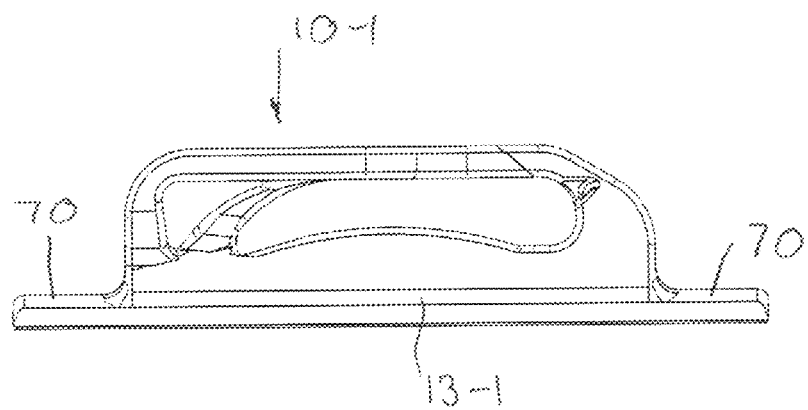
FIG. 41 is a front view thereof.
Figure 42:
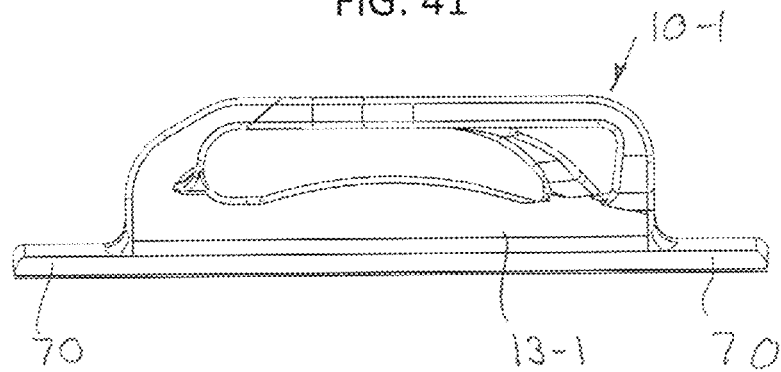
FIG. 42 is a rear view thereof.
Figure 43:
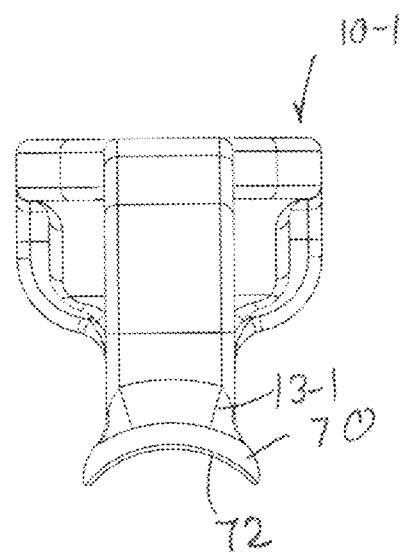
FIG. 43 is a nose end view thereof.
Figure 44:
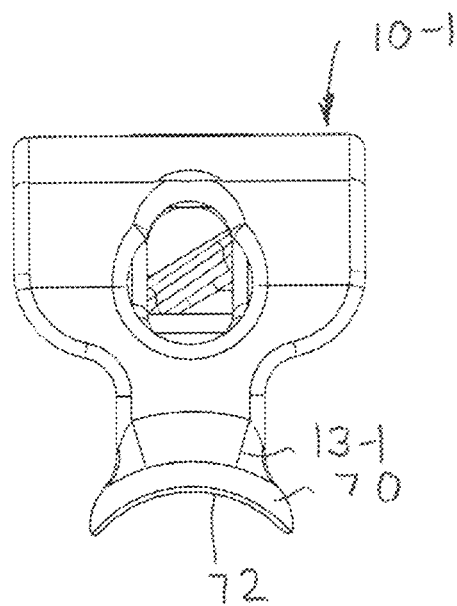
FIG. 44 is a tail end view thereof.
Figure 45:
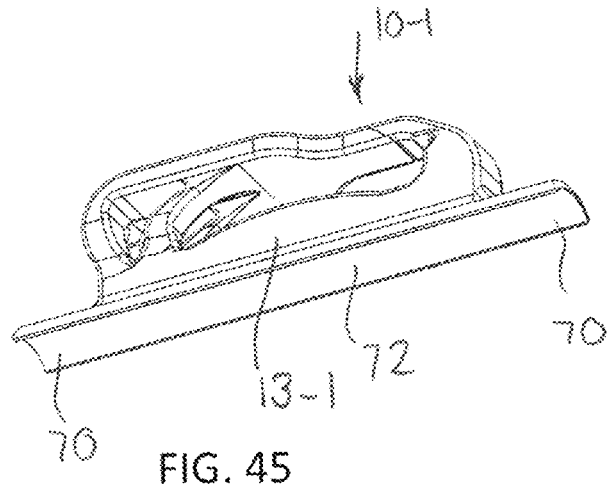
FIG. 45 is a bottom perspective view thereof.
Figure 46:
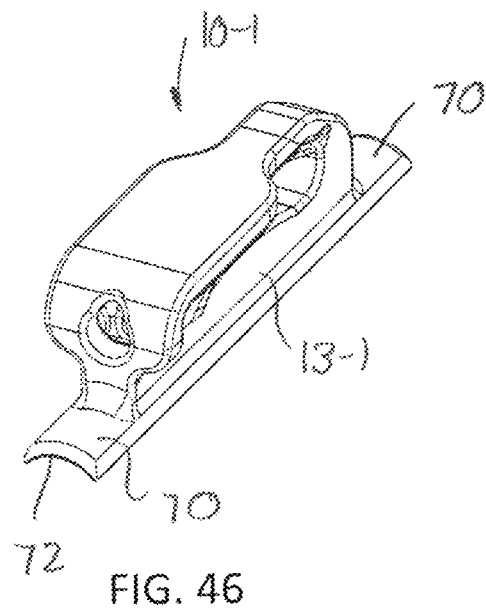
FIG. 46 is a top perspective view thereof.
Figure 47:
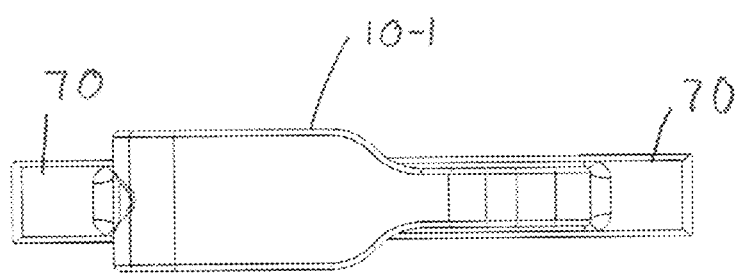
FIG. 47 is a top view thereof.
Figure 48:
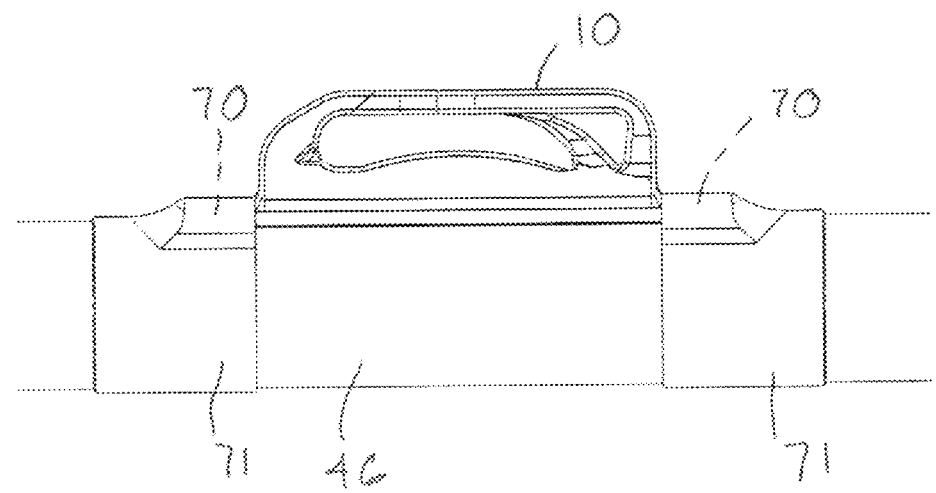
FIG. 48 is a rear side view of the fishing device of FIG. 40 mounted on a fishing rod.
Figure 49:
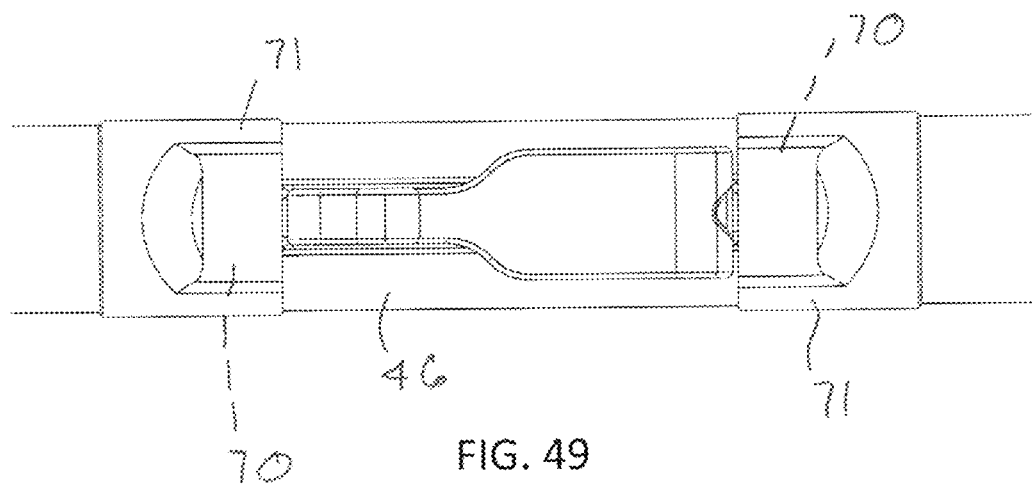
FIG. 49 is a top view thereof.

While the connector formations 48 and 49 and the mounting band 45 provide a preferred mounting arrangement, an alternate embodiment of the hook keeper is designated as 10-1 wherein the hook keeper 10-1 has alternate connector formations formed as end flanges 70 that can be bound to the rod 46 by flexible connector wraps or bands 71 that serve as alternate forms of attachment straps or connector members. These connector bands or members 71 serve as connector means and can take various forms such as wraps, compression bands, tape, cordage, adhesives and other similar semi-permanent or removable materials. FIGS. 41-47 are front, rear, right end, left end, bottom perspective, top perspective and top views of the hook keeper 10-1. The hook keeper 10-1 incorporates most features of the hook keeper 10 but instead has the connector flanges 70 extending axially from the base 13 at the opposite nose end 14 and tail end 15. These connector flanges 70 share a common arcuate surface 72 extending the full length of the base 13-1 that thereby mates and conforms to the outside rod surface 46A. FIG. 48 is a rear side view of the alternate hook keeper 10-1 of FIG. 40 mounted on a fishing rod 46; and FIG. 49 is a top view thereof.

In view of the foregoing, the carabiner-like hook keeper 10 provides the benefits of both a closed, and open style hook keeper since the hook keeper 10 is normally closed but is openable. As such, the hook keeper 10 can, for example, stow a weedless or Texas rigged hook without having to remove the bait or expose the hook 26. Further, the carabiner-like style of this hook keeper 10 also allows secure storage of a drop shot weight 60. Still further, the attachment aperture 43 can engage the tip of the hook 26, wherein the hook shank 26C can be stored in an upright position over the top of the hook keeper 10 or canted down along the side of the hook keeper 10.

Accordingly, the inventive hook keeper 10 includes a number of unique features, including but not limited to:

Hook guide groove or slot 25 is angled relative to the base 13 of the hook keeper 10 to control the angle the hook 26 is being stowed at.

Knot-assist hole 43 stows the hook 26 so the point is concealed within the interior 22 of the hook keeper 10.

Lever arm 33 on the hook keeper 10 is configured to define a carabiner arm style that accesses a pocket 20 at the keeper nose 14 to assist in hook storage.

Attachment band routing wherein the mounting formations 48 and 49 define a circuitous path for a single attachment band 45 such that the compression force of the band 45 is actually pulling the hook keeper 10 against the band. This is effective in helping the hook keeper 10 stay in place on the rod 46 as it increases the surface area of the band 45 contacting the rod 46.

Routing of the attachment band 45 between the hook keeper 10 and rod surface 46A provides a cushion that reduces the risk of the harder plastic of the hook keeper 10 marring the rod finish.

Forming of the lever arm 33 in an undeformed condition during manufacture, so that when it put into the "operational" position or in other words, deformed and engaged with the line guard 17 there is a spring force applied from the material itself, and not an externally installed component.

Although a particular preferred embodiment of the invention has been disclosed in detail for illustrative purposes, it will be recognized that variations or modifications of the disclosed apparatus, including the rearrangement of parts, lie within the scope of the present invention.

The invention claimed is:

1. A hook keeper for fishing comprising:
a main body having a nose end and a tail end spaced from each other by a middle section, said main body further comprising a base extending axially in an end-to-end direction between said nose end and said tail end and having one or more connector formations, which are engagable with a fishing rod to removably store said hook keeper on the fishing rod for temporary storage of fishing tackle, wherein said hook keeper is configured for mounting to said fishing rod with said nose end oriented toward a rod tip and said tail end oriented toward a rod handle;
said main body having a hollow keeper interior which opens sidewardly in a side-to-side direction through said hook keeper;
said nose end comprising an upright nose end wall projecting upwardly from said base and forming a front line guard having an outer guard face and an interior guard face, said interior guard face defining a first end of said hollow keeper interior, wherein a fishing hook may be hooked sidewardly over said interior guard face and held axially against said interior guard face when under tension from a fishing line for storage of said fishing hook on said front line guard; and
said tail end comprising an upright tail end wall projecting upwardly from said base and having an interior end wall face defining a second end of said hollow keeper interior and having an outer end wall face that faces away from said nose end, said end wall at said tail end having an attachment aperture provided as a storage location for said hook, wherein said attachment aperture opens axially in the end-to-end direction so that it opens axially through said outer and interior end wall faces into said hollow interior to allow insertion of a hook axially through said end wall.

2. The hook keeper according to claim 1, wherein said interior guard face is formed with an angled guide groove extending sidewardly and downwardly in said side-to-side direction along said interior guard face while being open axially along a groove length thereof into said hollow keeper interior.

3. The hook keeper according to claim 2, wherein said angled guide groove has opposite first and second groove ends with one being farther away from said base and the other being closer to said base so that said angled guide groove is angled relative to said base wherein a fishing hook can be hooked around said front line guard such that said guide groove angles a bend of said hook down towards a fishing rod with a point of said hook being positioned adjacent said base.

4. The hook keeper according to claim 3, wherein said attachment aperture serves as a knot pull down anchor for removably anchoring said hook on said tail end of said hook keeper when said hook keeper is mounted on a fishing pole and temporarily storing said hook in such position.

5. The hook keeper according to claim 1, wherein said connector formations comprise at least one pair of connector blocks that project sidewardly and engage opposite ends of a connector member, which is engagable with the fishing rod to secure said hook keeper on the fishing rod.

6. The hook keeper according to claim 5, wherein said connector member is an attachment strap formed as an O-ring and said main body includes two said pairs of connector blocks engaging with said O-ring, said O-ring being configured as a resiliently deformable endless loop which loops over each of said connector formations and is wrappable about a periphery of said fishing rod.

7. The hook keeper according to claim 1, wherein said attachment aperture can receive the tip of said hook, wherein a hook shank can be stored in an upright position over a top of said hook keeper or canted down along a side of said hook keeper.

8. A hook keeper for fishing comprising:
a main body having a nose end and a tail end spaced from each other by a middle section, said main body further comprising a base extending axially in an end-to-end direction between said nose end and said tail end and having one or more connector formations, which are engagable with a fishing rod to removably store said hook keeper on the fishing rod for temporary storage of fishing tackle, wherein said hook keeper is configured for mounting to said fishing rod with said nose end oriented toward a rod tip and said tail end oriented toward a rod handle;
said main body having a hollow keeper interior which opens sidewardly in a side-t-side direction through said hook keeper;
said nose end comprising an upright nose end wall projecting upwardly from said base and forming a front line guard having an outer guard face and an interior guard face, said interior guard face defining a first end of said hollow keeper interior, wherein a fishing hook may be hooked sidewardly over said interior guard face and held axially against said interior guard face when under tension from a fishing line for storage of said fishing hook on said front line guard;
said tail end comprising an upright tail end wall projecting upwardly from said base and having an axial thickness defined by an interior tail end wall face defining a second end of said hollow keeper interior and an outer tail end wall face that faces away from said nose end; and
a lever arm formed along an upper top area of said hollow keeper interior, which is joined to said tail end wall so as to project axially forwardly to said front line guard with a front arm end removably contacting said front line guard at a joint therebetween, said lever arm being resiliently deformable to allow downward separation of and formation of a gap at an interface between said front arm end and said front line guard to allow a hook or fishing line to be inserted through said gap into said hollow keeper interior, said lever arm including an inner lever arm face that aligns flush with said interior guard face at said interface which thereby prevents a fishing line from accidentally sliding into the keeper through said joint.

9. The hook keeper according to claim 8, wherein said lever arm is resiliently biased so as to press up against said front line guard near the nose end of the hook keeper so that there is no gap between said front lever end and said front line guard, said interface being defined by respective declined end faces of said front line guard and said lever arm which are normally in abutting contact but are separable to form said gap when said lever arm is deflected.

10. The hook keeper according to claim 9, wherein said front arm end and said front line guard include mating alignment formations, which fit together to align said lever arm and said front line guard in the side-to-side direction and prevent inadvertent, sideward separation thereof.

11. The hook keeper according to claim 10, wherein said alignment formations are configured in the form of a projection and notch, wherein said projection spans said interface.

12. The hook keeper according to claim 10, wherein said lever arm is configured in an undeformed condition with said front arm end disposed outwardly of said front line guard and said lever arm is flexed around and to an interior side of said front line guard to engage said alignment formations with said lever arm in an initial deformed condition.

13. The hook keeper according to claim 8, wherein said lever arm includes a spring arm extending between said lever arm and said base, which separates said hollow keeper interior into a nose portion and a tail portion, said spring arm resiliently supporting said lever arm wherein resilient deflection of said lever arm biases said lever arm against said front line guard while said spring arm additionally biases said lever arm against said front line guard.

14. The hook keeper according to claim 13, wherein said spring arm is resiliently deformable to allow deflection of said lever arm and formation of said gap.

15. The hook keeper according to claim 13, wherein said tail end wall at said tail end has an attachment aperture provided as a storage location for said hook, wherein said attachment aperture opens axially in the end-to-end direction so that it opens axially through said outer and interior end wall faces into said tail portion of said hollow interior to allow insertion of a hook axially through said tail end wall.

16. The hook keeper according to claim 15, wherein said spring arm serves as shielding for the point of the hook when stowed in the attachment aperture wherein a point of said hook is disposed within said tail portion of said hollow keeper interior.

17. The hook keeper according to claim 13, wherein said spring arm is shaped as one of a sideways curve or a v shape which resiliently supports said lever arm, said spring arm having top and bottom ends fixed at said lever arm and said base and an intermediate spring arm section that is resiliently flexible to permit and yet resist flexing of said lever arm during opening of said joint.

18. A hook keeper for fishing comprising:
a main body having a nose end and a tail end spaced from each other by a middle section, said main body further comprising a base extending axially in an end-to-end direction between said nose end and said tail end and having one or more connector formations, which are engagable with a fishing rod to removably store said hook keeper on the fishing rod for temporary storage of fishing tackle, wherein said hook keeper is configured for mounting to said fishing rod with said nose end oriented toward a rod tip and said tail end oriented toward a rod handle;

said main body having a hollow keeper interior which opens sidewardly in a side-to-side direction through said hook keeper;

said nose end comprising an upright end wall projecting upwardly from said base and forming a front line guard having an outer guard face and an interior guard face, said interior guard face defining a first end of said hollow keeper interior, wherein a fishing hook may be hooked sidewardly over said interior guard face and held axially against said interior guard face when under tension from a fishing line for storage of said fishing hook on said front line guard; and said tail end comprising an upright end wall projecting upwardly from said base and having an interior end wall face defining a second end of said hollow keeper interior and having an outer end wall face that faces away from said nose end, said tail end wall at said tail end having an attachment aperture provided as a storage location for said hook;

said connector formations comprising at least two pairs of connector blocks that are respectively located proximate said nose and tail ends and project sidewardly from said base to engage opposite ends of an attachment band, wherein said attachment band is removably engagable with the fishing rod to secure said hook keeper on the fishing rod, said attachment band having an endless shape forming resiliently deformable loop which loops over each of said connector formations and is wrappable about a periphery of said fishing rod, said attachment band having intermediate band portions extending under said middle section of said base axially between said pairs of connector formations so as to be compressed between an underside of said base and said fishing rod when mounted thereto.

19. The hook keeper according to claim 18, wherein said attachment band is formed as an O-ring and said O-ring defines said loop that is resiliently deformable and loops over each of said connector formations of said pairs thereof and under said main body axially between said pairs of said connector formations.

20. The hook keeper according to claim 18, wherein said middle section of said base includes attachment band routing channels formed in said underside of said base that receive said intermediate band portions of said attachment band to help locate and maintain said intermediate band portions in compression and resist movement of said hook keeper on said fishing rod.

* * * * *